Nov. 11, 1958 H. J. McCREARY 2,860,182
TAPE MOVEMENT CHECK IN A TELEGRAPH SYSTEM
Filed Oct. 22, 1953 4 Sheets-Sheet 1

INVENTOR.
HAROLD J. MC CREARY
BY
ATTY.

Nov. 11, 1958   H. J. McCREARY   2,860,182
TAPE MOVEMENT CHECK IN A TELEGRAPH SYSTEM
Filed Oct. 22, 1953   4 Sheets-Sheet 2

INVENTOR.
HAROLD J. McCREARY
BY
ATTY.

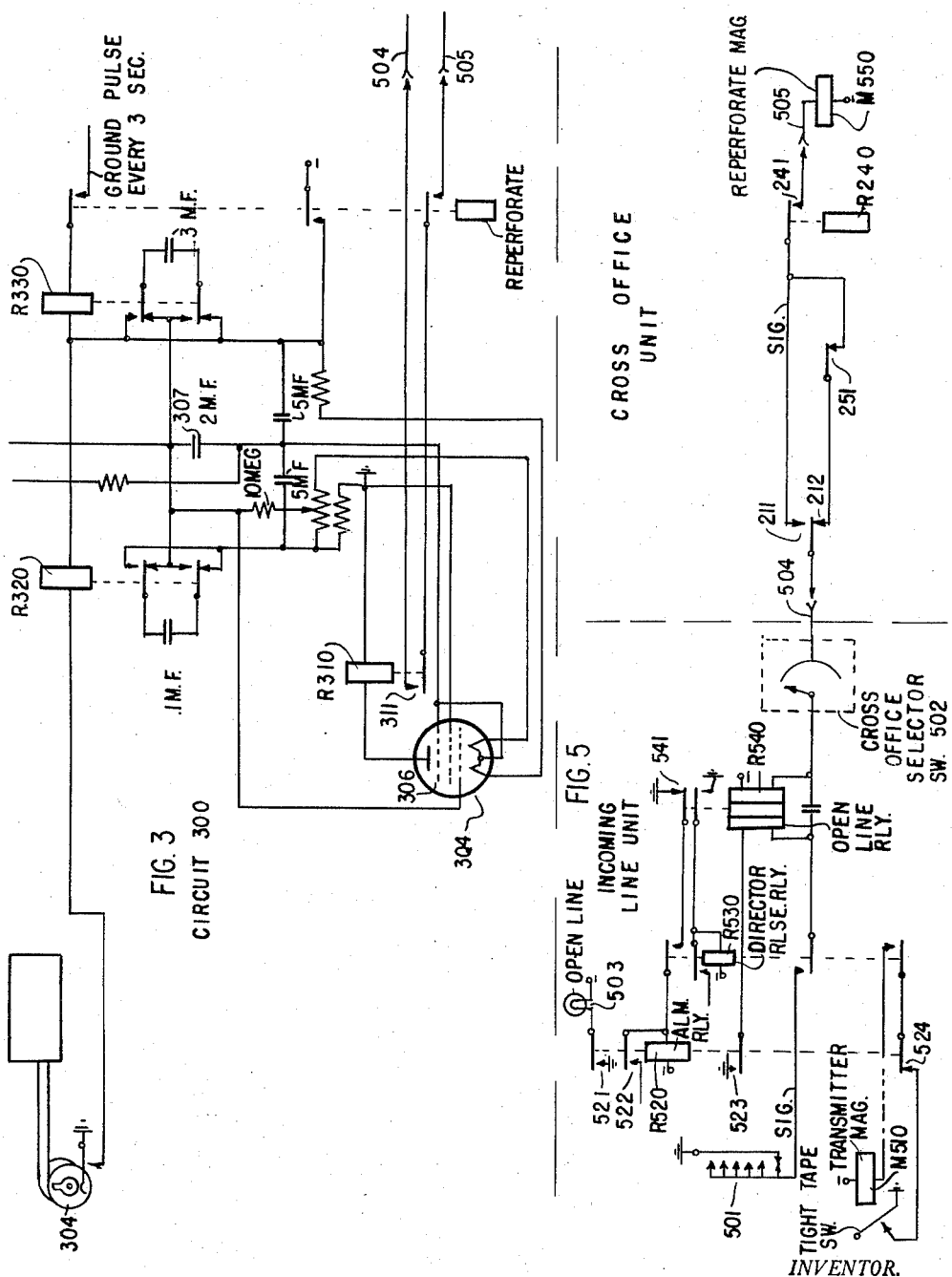

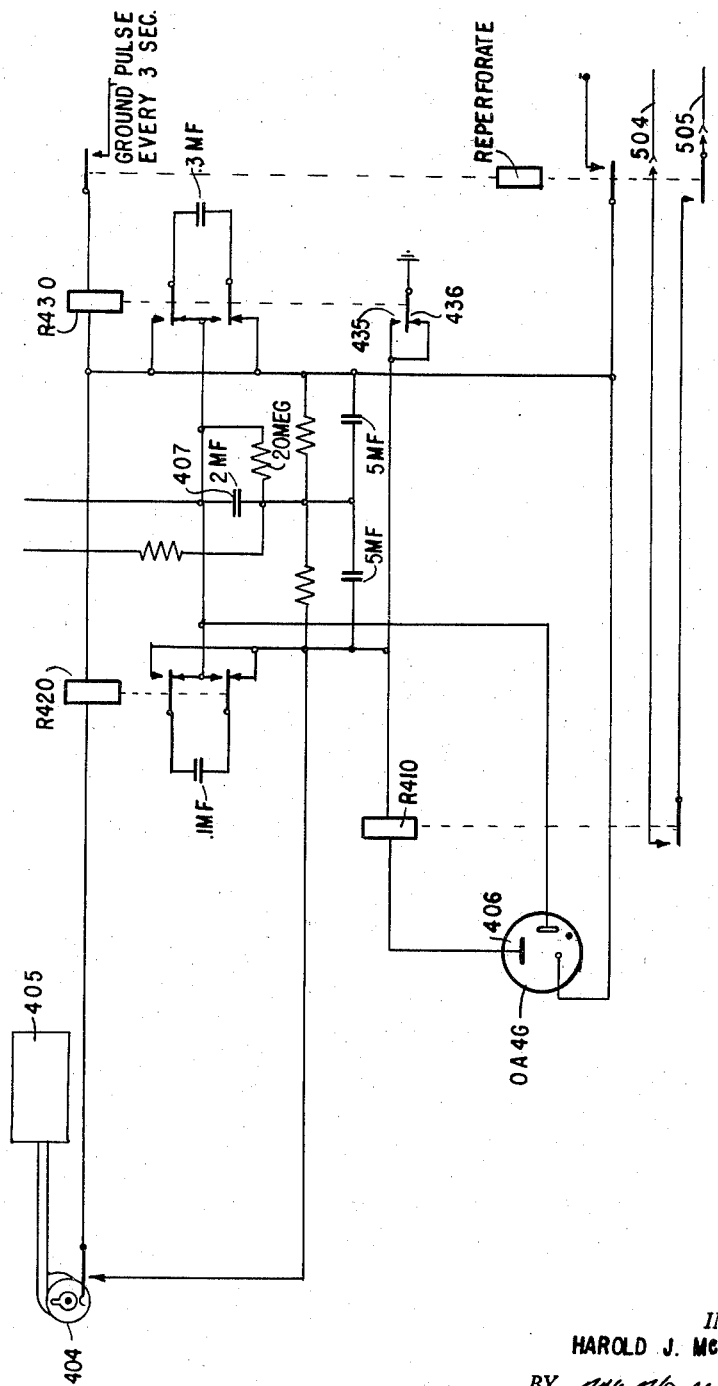

United States Patent Office 2,860,182
Patented Nov. 11, 1958

2,860,182
TAPE MOVEMENT CHECK IN A TELEGRAPH SYSTEM

Harold J. McCreary, Lombard, Ill., assignor to General Telephone Laboratories, Incorporated, a corporation of Delaware Application October 22, 1953, Serial No. 387,580

3 Claims. (Cl. 178—17.5)

This invention relates to telegraph systems and more particularly to supervisory equipment for use with message-recording mechanisms in telegraph systems.

In telegraph systems using teletypewriters, it is important that an alarm be given should the tape break while being fed to a reperforator, so that a message or messages will not be lost during transmission. The proper movement of the tape is a further indication of the satisfactory operation of the transmitter and of the reperforator motor and tape feed mechanism, and therefore, it is an object of this invention to provide means for continuously checking the movement of tape being fed to a reperforator and for giving an alarm if the tape fails to move while the reperforator is receiving signals.

It is a further object of this invention to provide means for giving an alarm and for stopping the transmission of signals from a transmitter to a reperforator if, during said transmission, the tape to be fed to the reperforator should stop moving or fail to start moving.

A feature of this invention is the use of an electronic circuit for operating an alarm in case of a failure of the tape to feed to the reperforator.

A further feature is the stopping of the transmission of signals when an alarm is given.

Another feature is the utilization of common alarm equipment for open line conditions or tape movement failures.

Another feature is the simulation of an open line condition when the reperforator tape fails to move normally.

Another feature is the provision for a time delay in operating an alarm whereby no alarm will be given if a short, temporary failure of the tape to move corrects itself.

Further objects and features will be evident upon a perusal of the following disclosure in which:

Figs. 1 to 4 inclusive show four species of the present invention.

Fig. 5 shows equipment and circuits associated with Figs. 2 to 4.

It will be noted that, although the herein disclosed invention has been developed for use with reperforators in cross office units of the automatic telegraph switching system disclosed in the copending application of R. C. Stiles, Serial No. 260,854, filed December 10, 1951, now issued as Patent 2,805,283 on September 3, 1957, it will be understood that said invention may be utilized with other signal-receiving recording mechanisms. If a reperforator, permanently connected to a single source of signals, fails to record a received message, the unrecorded message can easily be determined by checking the messages at the single source even though considerable time has elapsed before the discovery of the fault.

However, a continuous reperforator tape movement check is felt to be imperative when the reperforator, such as that shown in the cross office unit 3400 of the above-mentioned copending application, can be selected for receiving signals from any one of a plurality of sources. The task of comparing all messages received from all of said sources with all messages recorded by all of the available cross office unit reperforators, as well as the reperforators associated with the multiple call position and the intercept operator position shown in said copending application, in order to find a lost message would become difficult and burdensome. Therefore, the present invention may be utilized to its best advantage when used with the reperforators associated with the cross office unit 3400, the multiple call position 3340 and the intercept operator position 3330 shown and described in said copending application.

In all of the species shown herein, a normally restored control relay is controlled to operate, or a normally operated control relay is controlled to restore when, after a circuit is established over which a reperforator receives signals of a telegraph message, the tape storage reel associated with the reperforator fails to rotate or stops rotating after having started to rotate. The control relay then controls equipment for giving an alarm and for preventing further transmission of signals.

Before discussing the detailed operation of the circuits shown herein, it may be well to briefly discuss the operation of the system disclosed in the copending application of R. C. Stiles as it is pertinent to the invention herein.

In said system of Stiles, an incoming line circuit such as circuit 400 receives a message; a reperforator 330, associated with the incoming line circuit 400, records the message in a tape 333; a director such as director 200A is controlled to seize a cross office unit such as unit 3400 by way of a selector switch such as switch 3300. Shortly thereafter the director 200A is released; a circuit is completed for operating a magnet M364 of the transmitter 360, associated with the incoming line circuit 400; and a reperforator relay R3800 in the cross office unit 3400 is operated to complete a circuit over which the transmitter 360 sends signals of the message to the magnet M3411 of the reperforator 3410, associated with cross office unit 3400. The reperforator 3410 records the message in a tape 3413, fed from a tape reel 3412.

In said copending application of R. C. Stiles, the director can cause the message to be sent to a cross office unit such as 3400, to the multiple call position 3340 or to the intercept operator position 3330. For purposes of the description herein, it will be assumed that the message is sent to a cross office unit. However it will be understood that the circuits shown herein can be utilized in said multiple call and intercept operator positions.

DETAILED DESCRIPTION

Figure 1:
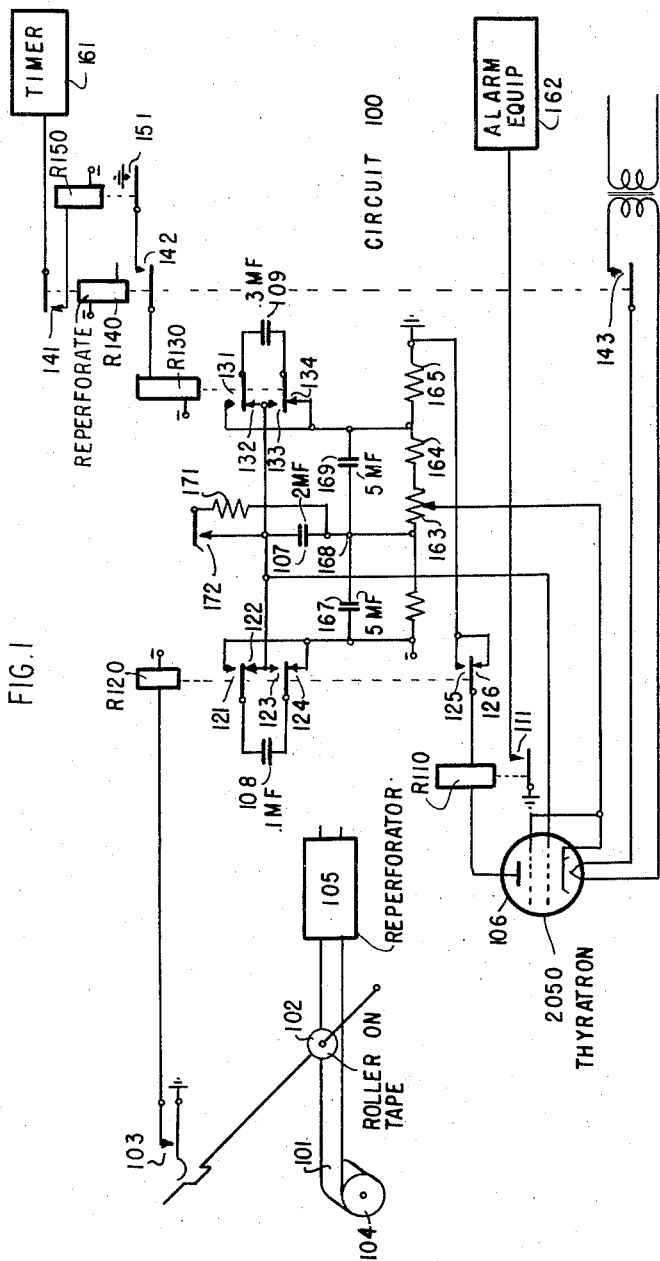

Circuit 100 of Fig. 1

Circuit 100 of Fig. 1 shows an arrangement for operating alarm equipment 162 if the tape 101 fails to rotate roller 102, for example if the tape 101 tears. Normally, when reperforator 105 is receiving and recording a message, it pulls the tape 101 from tape reel 104, the latter being biased in a counter-clockwise direction to keep the tape taut. As tape 101 moves, it rotates roller 102 which will close contacts 103 periodically. It is preferred that contacts 103 be closed once each second as the tape moves. This may be adjusted by controlling the size of roller 102 with relation to the rate of feed of the tape 101 from reel 104 to reperforator 105.

A thyratron 106, together with its associated circuit, is provided for controlling the operation of an alarm control relay R110. Two pulsing relays R120 and R130 are provided, one for charging the grid of the thyratron negatively, the other for charging the grid positively. Under normal conditions, the charges cancel each other and a normal negative bias on the grid prevents the operation of the thyratron. However, if the negative charges are not delivered to the grid, the positive charges will eventually reach cutoff potential and fire the tube 106, thereby to cause the alarm relay R110 to operate.

With reference to said two pulsing relays R120 and R130, it will be noted that they control the charging and discharge of two capacitors 108 and 109 respectively.

When both relays are restored a circuit is completed for charging said capacitors 108 and 109 in series with said circuit extending from positive ground over the resistance element 165, contacts 134, capacitor 109, contacts 132 and 122, capacitor 108 and contacts 124 to negative battery. In said charging circuit the .3 mf. capacitor 109 will store a charge three times as large as that stored in the .1 mf. capacitor 108 as is well-known in the art. When relay R130 operates, it closes contacts 131 and 133 to reverse the connections of capacitor 109 in said circuit; capacitor 109 discharges over a circuit including contacts 131, resistance element 164, capacitor 107 and contacts 133; and the charge which was stored in capacitor 109 is now stored in capacitor 107. While said connections are reversed capacitor 109 is also charged again but in the opposite direction and when the contacts 132 and 133 are restored to their normal closed position this second charge is also "dumped" into capacitor 107 to further raise the potential across capacitor 107. In a similar manner, each operation of relay R120 causes capacitor 108 to "dump" two charges into capacitor 107; but, since the latter charges are of a polarity opposite to those "dumped" into capacitor 107 by capacitor 109, the potential across capacitor 107 decreases.

The large 5 mf. capacitors 167 and 169 are used to maintain point 168 at a constant potential in a manner well-known in the art.

In Fig. 1, the relay R140 corresponds to the above-described reperforate relay R3800 of the Stiles system; reperforator 105 corresponds to reperforator 3410 of said system; tape 101 corresponds to tape 3413 of said system; and tape reel 104 corresponds to tape reel 3412 of said system.

When the reperforate relay R140 of Fig. 1 is operated after the seizure of its associated cross office unit, it closes contacts 141 to start the timer equipment which sends a ground pulse to relay R150 every 3 seconds; at contacts 142, R140 prepares the operating circuit for pulsing relay R130; and, at contacts 143, completes an obvious circuit for heating the thyratron filament.

Each time R150 operates, it closes contacts 151 to operate the pulsing relay R130 over an obvious circuit.

With reference to the variable resistance element 163, it will be noted that the thyratron grid is biased negatively with respect to the cathode. The variable tap on said resistance element can be adjusted so that the grid is normally biased beyond cut off thereby to prevent the tube 106 from firing.

When pulsing relay R130 momentarily operates every three seconds, it closes contacts 131 and 133 to transfer a positive charge from capacitor 109 to the grid bias capacitor 107. With the capacitor values shown in Fig. 1, the capacitor 107 will be charged positively about nine volts each time that R130 operates. If the other pulsing relay R120 fails to operate, the grid potential will be raised to cutoff by a predetermined number of operations of R130; and the tube will fire.

However, if the tape 101 is moving to rotate roller 102, contacts 103 momentarily close once each second to operate pulsing relay R120. R120 closes contacts 121 and 123 momentarily to transfer the negative charge stored in capacitor 108 to the grid bias capacitor 107. Because of the capacitor values shown in Fig. 1, the capacitor 107 will be charged negatively about three volts each time that R120 operates.

Therefore, when there is no fault in the movement of tape 101, three operations of R120 each three seconds causes capacitor 107 to be charged negatively nine volts; and one operation of R130 causes said negative charge to be cancelled. With said charges cancelling each other, the normal negative bias on the grid due to the voltage drop over the resistance element 163 will prevent the tube from operating.

As previously stated, however, the tube will fire if R120 fails to operate. When tube 106 fires, it operates the alarm control relay R110 over its plate circuit. Relay R110 closes contacts 111 to operate alarm equipment 162, audible and/or visual, of any type well-known in the art. An attendant will then stop the transmitter and reperforator and check for the source of trouble.

The normal negative bias may be adjusted so that it will take three, six, nine, etc., seconds after the failure of R120 to operate before the tube 106 will fire.

Once the tube fires, the grid loses control of the circuit. Therefore deionizing contacts 125 and 126 have been inserted in the plate circuit to deionize the tube each time that R120 operates while the tube is passing current whereby the grid momentarily regains control. If due to the grid potential, the tube again fires, the relay R110 will not release since the brief interruption of current flow in the plate circuit is of a shorter time interval than the release time of R120.

After an attendant removes the source of trouble, he repositions the tape in the transmitter so as to repeat the entire message, then starts the transmitter and reperforator again. While the attendant has been repairing the fault, relay R130 has been operating to store positive charges on the grid of tube 106. Therefore, when the transmitter is again started, a means must be provided for discharging the capacitor 107. This can be done by momentarily closing contacts 172 to complete a discharge circuit including a low resistance element 171. If tube 106 is still passing current, when the capacitor 107 is thus discharged, it will be deionized upon the next operation of R120. The grid potential will be beyond cutoff and tube 106 will not fire again. Therefore alarm relay R110 will restore, and circuit 100 will be ready to again check the tape movement.

Figure 2:
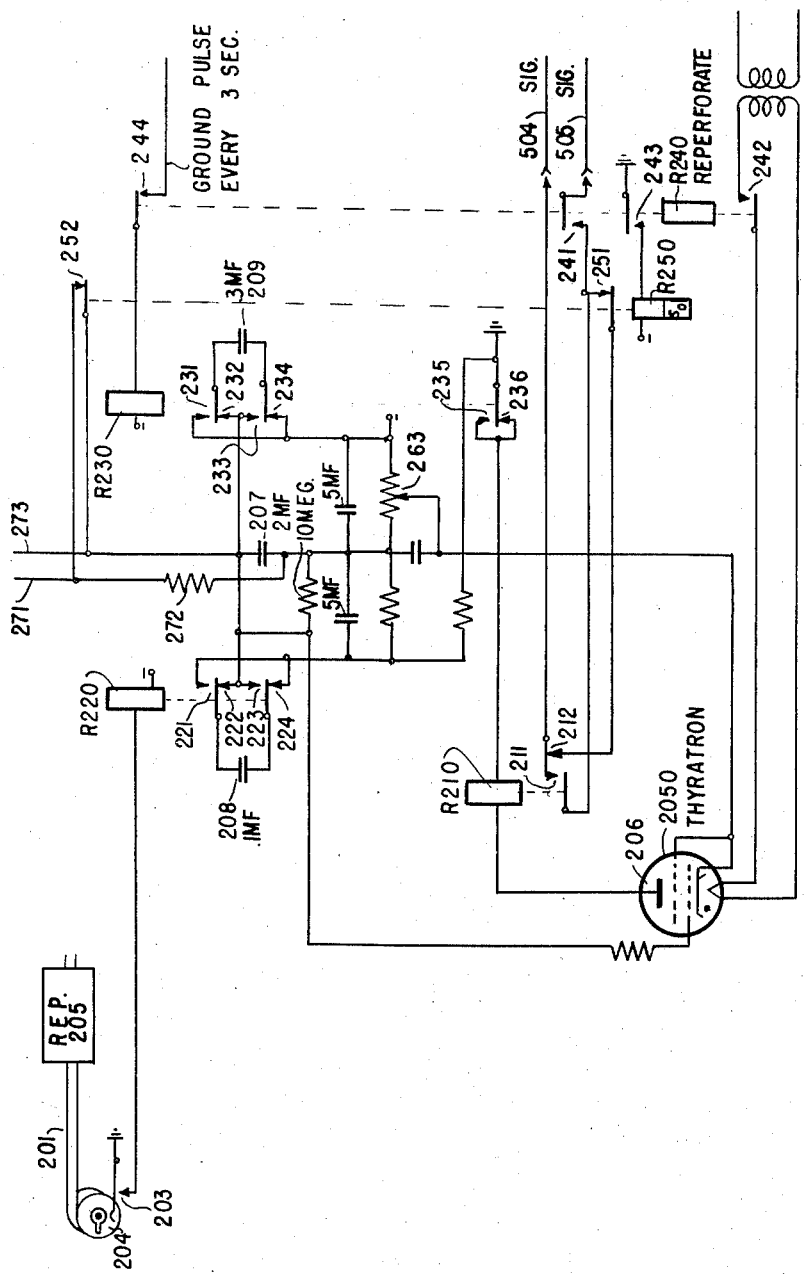

*Circuit 200 of Fig. 2*

Before entering into a detailed description of circuit 200, it may be well to note that it differs from circuit 100 in four main respects:

(1) A thyratron tube 206 is controlled to normally pass current so long as the tape 201 is being fed to the reperforator at a normal rate; and therefore relay R210 is normally operated; whereas in circuit 100, alarm relay R110 is normally restored.

(2) Instead of directly operating an alarm, relay R210 (circuit 200) when restored, opens the signalling circuit to cause the open line alarm equipment shown in the above-mentioned copending application of R. C. Stiles to be operated.

(3) R210 also controls indirectly a means for stopping the transmission of signals as well as a means for giving an alarm when the tape 201 is not fed normally.

(4) Instead of using a roller on the tape to control the operations of one of the pulsing relays, circuit 200 uses a projection (or projections as required) on the tape reel to close contacts to operate said one relay as the reel rotates. It is evident that the tape reel will rotate a greater amount for a given lengh of tape fed out as the amount of tape on the reel decreases. Therefore it is necessary that the pulsing relay R220 be operated often enough at all times, even when tape reel 204 rotates at its slowest rate, so that tube 206 will continue to pass current as long as the tape reel rotates normally.

At this point, it may be desirable to briefly discuss the relationship between circuit 200 and the circuits shown and described in said copending application of R. C. Stiles. Fig. 5 schematically shows circuits corresponding to circuits of the copending application which are controlled by circuit 200 to give an alarm and to stop transmission if, for example, the tape in the cross office unit reperforator should break. The circuit shown in Fig. 5 for operating the transmitter magnet M510 differs from the corresponding circuit of the copending application in one respect, however, in that the alarm relay R520 of Fig. 5, when operated, opens said operating circuit at contacts 524 to stop transmission. This was not shown in the corresponding circuit of said copending application. In Fig. 5, the signal circuit is shown, as extending from contacts 501 of the transmitter sensing pins, through make contacts on a director release relay R530, the lower winding of a slow-to-release open line relay R540, selector switch 502, conductor 504, contacts 212 of relay R210 (shown in Fig. 2), contacts 251 of time delay relay R250 (shown in Fig. 2), contacts 241 of the reperforate relay R240 and conductor 505 to the reperforate magnet M550. In the corresponding circuit of said copending application, contacts corresponding to contacts 211, 212 and 251 were not shown.

Assume that a message has been received and stored in the incoming line circuit with which the transmitter magnet M510 (Fig. 5) is associated, that the cross office selector switch 502 under the control of a director has selected the cross office unit with which reperforate magnet M550 is associated, that the associated reperforate motor has been started, that open line relay 540 has been operated followed by the operations of the director release relay R530, the reperforate relay R240 and the transmitter magnet M510, and that the magnet M510 is thereafter controlled to send signals over the above-described signal circuit in accordance with the message all in the manner described in detail in said copending application.

When reperforate relay R240 (Fig. 2) operates it closes contacts 242 to complete a circuit for the filament of thyratron 206; at contacts 243, completes an obvious circuit for operating the slow-to-operate relay R250; at contacts 244, completes an obvious circuit for sending a momentary pulse every three seconds from a timing device (not shown) to pulsing relay R230; and at contacts 241 completes the above-described signalling circuit between the transmitter contacts 501 and the reperforate magnet M550 as indicated in Fig. 5.

The transmitter magnet M510 and the reperforate relay R240 are operated almost simultaneously; and the signalling circuit must be completed within a very short time interval thereafter. The species of this invention shown in Fig. 2 has been designed so that relay R210 will be normally operated; and, if restored during the transmission of signals to the cross office unit, it will open the signalling circuit at contacts 211 to start a sequence of operations which will give an alarm and stop the transmission of signals. However, since the thyratron 206 cannot fire until after a short time delay for heating its filament, contacts 211 in the signalling circuit will be open even though the transmitter has started and may be sending signals. Therefore, it is necessary to provide a circuit for temporarily short circuiting contacts 211 to close the signalling circuit, i. e. an obvious circuit including contacts 212 and 251. The operate time of R250 is adjusted such that relay R210 will operate to close the make before break contacts 211 before R250 operates to open contacts 251; and, as a result thereof, the signalling circuit is closed and maintained closed after the reperforate relay R240 operates. When R250 operates, it opens at contacts 252 a discharge circuit for grid capacitor 207. This discharge circuit having a very short time constant assures the absence of a charge on said capacitor when the reperforate relay R240 operates.

It is to be noted that R540 is operated over a circuit including its upper winding (not fully shown), but held operated over its lower winding by way of the signalling circuit.

Referring specifically to the variable resistance element 263, it will be seen that the thyratron grid is biased positive with respect to the cathode; and that therefore (without regard to the pulsing relays R220 and R230 and the circuits they control) the thyratron will fire to operate relay R210 as soon as the filament has heated the cathode sufficiently.

Every three seconds, R230 will momentarily close contacts 231 and 233 to "dump" a nine volt negative charge (stored in capacitor 209) into the grid capacitor 207. So long as the tape 201 is fed normally to the reperforator 205, contacts 203 will momentarily close every second to operate R220. R220 will momentarily close contacts 221 and 223 to "dump" a positive three volt charge stored in capacitor 208 into the grid capacitor 207. These negative and positive charges will cancel each other so long as the tape is fed out normally.

As is well-known in the art, the grid of a thyratron loses control over the tube once it has fired. Therefore, deionizing contacts 235 and 236 have been provided in the plate circuit to momentarily open the circuit every time R230 operates. When the plate circuit is momentarily opened, the thyratron is deionized; the grid again gains control; and, if its potential is below cutoff, it will cause the thyratron to again fire. This momentary interruption of plate current will not cause R210 to restore.

If the tape is not fed out normally from the tape reel 204 and, as a result thereof, R220 does not operate every second, then soon thereafter, the operations of R230 will cause negative charges to raise the grid potential to a potential sufficiently negative to prevent the thyratron from firing after it has been deionized by the operations of contacts 235 and 236. Relay R210 will then restore to open the signalling circuit at contacts 211. After a short time delay, the open line relay R540 (Fig. 5) will restore to complete, at contacts 541, an obvious circuit for operating the alarm relay R520 which locks itself operated over a circuit only partially shown.

At contacts 521, R520 lights an alarm lamp 503; at contacts 523, reoperates open line relay R540; and, at contacts 524, opens the operating circuit of the transmitter magnet M510 to prevent further transmission of signals.

After the trouble has been removed and the tape repositioned in the transmitter, circuit 200 will be placed in condition for again checking the movement of the reperforator tape when, as described in said copending application of R. C. Stiles, the operator momentarily depresses a release key (not shown) to release the alarm relay R520 and further to close contacts (not shown) for completing a quick discharge circuit for removing any charge on capacitor 207, said circuit including conductor 271, low resistance element 272, and conductor 273. The normal positive grid bias will cause tube 206 to again fire to reoperate R210.

*Circuit 300 of Fig. 3*

Circuit 300 is quite similar to circuit 200, except that in circuit 300, applicant has utilized a quick heat vacuum tube requiring less than two tenths of a second to heat. The necessity of keeping the signalling circuit closed during the heating time of vacuum tube 306 is not necessary. As previously described, the open line relay R540 is operated independent of the signalling circuit, but it is to be maintained operated over said signalling circuit after the reperforate relay is operated. But R540 is a slow-to-release relay which has a release time of approximately three tenths of a second. Since the grid of tube 306 is biased positively, it will pass current to operate relay R310 in approximately two tenths of a second; and R310 will close contacts 311 to complete the signalling circuit before the open line relay R540 can restore; and the open line relay R540 will be maintained in its operated position.

As is well-known in the art, the grid of a vacuum tube never loses control of the tube; and, as a result, there is no need for deionizing contacts such as contacts 235 and 236 in circuit 200.

In a manner similar to that described with respect to circuit 200, the positive and negative charges, "dumped" into condenser 307 as a result of the operations of relays R320 and R330 respectively, will cancel each other so long as the tape reel 304 rotates normally, and tube 306 will continue to pass current to maintain relay R310 operated.

However, if the tape reel 304 stops, the negative potential on the grid of tube 306 will soon reach cutoff as a result of the repeated operation of R330, and the tube will no longer conduct. Relay R310 will restore to open the signalling circuit at contacts 311; an alarm will be given; and the transmission of signals will be stopped all in a manner described with respect to circuit 200.

It will be noted that a 50 volt potential can be used as shown, although a 120 volt source may be preferable.

Circuit 400 of Fig. 4

The operation of circuit 400 is also similar to that of circuit 200, except that it is arranged for the utilization of a cold gas tube 406. Since the starter anode of the tube 406 loses control once the tube fires, deionizing contacts such as 435 and 436 must be used to reestablish the control of said starter anode each time that the pulsing relay R430 operates.

The cold gas tube 406 requires no heating element, and therefore the relay R410 gains immediate control of the signalling circuit. A slow-to-operate relay such as R250 in circuit 200 is therefore not necessary.

The starter anode potential is normally biased positively with respect to the cathode and varies in accordance with the charge in capacitor 407. Tube 406 will normally fire to operate R410, and R410 will restore only if the tape reel 404 stops rotating during the transmission of signals from a transmitter to the reperforator 405 associated with the tape reel 404.

Circuit 400 controls the alarm equipment shown in Fig. 5 in a manner similar to that in which circuit 200 controls said equipment.

Although specific values have been given for some of the capacitive and resistance elements in the circuits shown herein, it is to be understood that they are given by way of example only and that this application is not to be limited to said values.

Further, there are several variable features for all of the species herein which applicant desires to point out:

(1) The number of charges of one polarity "dumped" into the two microfarad capacitor which are required to cancel the charges of the opposite polarity "dumped" into said capacitor is dependent upon the relative capacitance values of the capacitors shown as .1 microfarad and .3 microfarad. The relative sizes of the latter two capacitors will be determined by the rate at which the pulsing relay controlled by the tape movement is operated in comparison with the once every three seconds operations of the other pulsing relay.

(2) The number of charges (delivered to the two microfarad capacitor by the pulsing relay which is operated every three seconds) which are necessary to control the respective circuits to cause an alarm to be given can be varied by varying the normal bias potential on the control grids of the tubes. In this manner, the desired time delay between the sensing of an apparent fault and the starting of the alarm control equipment can be obtained.

While there has been described what is at present considered to be the preferred embodiments of the invention, it will be understood that various modifications may be made therein; and it is contemplated to cover in the appended claims all such modifications as fall within the true spirit and scope of the invention.

What is claimed is:

1. For use in a telegraph system having a transmitter for sending signals of a telegraph message by way of a signalling circuit to a reperforator to cause the reperforator to record the message upon a tape which is fed from a tape reel to the reperforator, the improvement comprising a tape feed alarm circuit, a source of timed external pulses, reperforate means operative during the sending of telegraph messages over said signalling circuit to said reperforator, means for connecting said source to said alarm circuit in response to the operation of said reperforate means to transmit timed pulses from said source to said alarm circuit, tape and tape feed means for feeding said tape to said reperforator during said sending to said reperforator, pulsing means controlled responsive to the feeding of said tape to said reperforator for transmitting tape controlled pulses to said alarm circuit, control means in said alarm circuit jointly controlled by said timed pulses and said tape controlled pulses, a relay in said alarm circuit, said control means operating said relay in response to the receipt of said timed pulses only in case no tape controlled pulses are received from said pulsing means, and means controlled by the operation of said relay for giving an alarm and for stopping the transmission of signals from the transmitter.

2. For use in a telegraph system having a transmitter, a reperforator, means for transmitting signals from said transmitter to cause repeated operation of said reperforator, a tape reel from which tape is fed to the reperforator for recording messages therein in accordance with said signals and means for operating said tape reel in coordination with the operations of said reperforator, a timer, an independent source of constant frequency pulses, means for sending indications of the operation of said tape reel to said timer, and means controlled by said timer responsive to said pulses for stopping the transmission of signals from the transmitter and for giving an alarm in case said indications of the operation of the tape reel are not sent to the timer.

3. For use in a telegraph system having a transmitter, a reperforator, means for selecting and seizing the reperforator, means for causing the transmitter to send signals of a telegraph message to the reperforator, and means in the reperforator for recording the message in a tape supplied thereto from a tape reel, an alarm system comprising a cold cathode tube circuit, a control relay connected to the plate of the tube, means for applying a normal positive bias potential to the starter anode of the tube, means including said bias potential for causing the tube to pass current when the reperforator is seized thereby to operate said control relay, a circuit over which signals are sent from the transmitter to the reperforator, means controlled by the operation of said relay for completing said circuit, means controlled upon the seizure of the reperforator for periodically lowering the positive bias potential of the starter anode and for momentarily deionizing the tube to give the starter anode control of the circuit, means controlled by the movement of tape to the reperforator for periodically raising the positive bias potential of the starter anode, said seventh and eighth means maintaining the starter anode potential substantially at said normal positive potential, said seventh means preventing further passing of current by the tube if said eighth means fails to operate due to the failure of the tape to move, thereby to restore the control relay, said sixth means controlled upon the restoration of the control relay to open the signalling circuit, and means controlled upon the opening of the signalling circuit for giving an alarm and for preventing further transmission of signals by the transmitter.

References Cited in the file of this patent

UNITED STATES PATENTS

| | | |
|---|---|---|
| 1,985,640 | Kitchens | Dec. 25, 1934 |
| 2,142,880 | Anderson | Jan. 3, 1939 |
| 2,176,742 | Pierre | Oct. 17, 1939 |
| 2,351,229 | Potts | June 13, 1944 |
| 2,404,339 | Zenner | July 16, 1946 |

FOREIGN PATENTS

| | | |
|---|---|---|
| 827,082 | Germany | Sept. 14, 1953 |